US006971098B2

(12) United States Patent
Khare et al.

(10) Patent No.: US 6,971,098 B2
(45) Date of Patent: Nov. 29, 2005

(54) METHOD AND APPARATUS FOR MANAGING TRANSACTION REQUESTS IN A MULTI-NODE ARCHITECTURE

(75) Inventors: Manoj Khare, Saratoga, CA (US); Akhilesh Kumar, Santa Clara, CA (US); Ioannis Schoinas, Portland, OR (US); Lily Pao Looi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 769 days.

(21) Appl. No.: 09/891,522

(22) Filed: Jun. 27, 2001

(65) Prior Publication Data
US 2003/0005167 A1 Jan. 2, 2003

(51) Int. Cl.[7] ................................................ G06F 9/46
(52) U.S. Cl. ....................... 718/101; 718/100; 718/101; 718/102; 718/105
(58) Field of Search ............................... 718/100–102, 718/105

(56) References Cited

U.S. PATENT DOCUMENTS

| | | | |
|---|---|---|---|
| 5,485,579 A | 1/1996 | Hitz et al. ............. 395/200.12 |
| 5,495,419 A | 2/1996 | Rostoker et al. ............ 364/468 |
| 5,535,116 A | 7/1996 | Gupta et al. ................ 364/134 |
| 5,541,914 A | 7/1996 | Krishnamoorthy et al. ... 370/56 |
| 5,551,048 A | 8/1996 | Steely, Jr. .................... 395/800 |
| 5,557,533 A | 9/1996 | Koford et al. ............... 364/491 |
| 5,581,729 A | 12/1996 | Nishtala et al. ............. 395/470 |
| 5,588,131 A | 12/1996 | Borrill ......................... 395/473 |
| 5,588,132 A | 12/1996 | Cardoza ...................... 395/475 |
| 5,588,152 A | 12/1996 | Dapp et al. .................. 395/800 |
| 5,590,292 A | 12/1996 | Wooten et al. .............. 395/825 |
| 5,590,345 A | 12/1996 | Barker et al. ............... 395/800 |
| 5,594,918 A | 1/1997 | Knowles et al. ............ 395/800 |
| 5,603,005 A | 2/1997 | Bauman et al. ............. 395/451 |
| 5,613,136 A | 3/1997 | Casavant et al. ........... 395/800 |
| 5,617,537 A | 4/1997 | Yamada et al. ........ 395/200.01 |
| 5,625,836 A | 4/1997 | Barker et al. ............... 395/800 |
| 5,634,004 A | 5/1997 | Gopinath et al. ...... 395/200.02 |
| 5,634,068 A | 5/1997 | Nishtala et al. ............. 395/800 |
| 5,636,125 A | 6/1997 | Rostoker et al. ........ 364/468.28 |
| 5,644,753 A | 7/1997 | Ebrahim et al. ............ 395/458 |
| 5,655,100 A | 8/1997 | Ebrahim et al. ............ 395/471 |
| 5,657,472 A | 8/1997 | Van Loo et al. ............ 395/485 |
| 5,678,026 A | 10/1997 | Vartti et al. ................. 395/479 |

(Continued)

*Primary Examiner*—Meng-Al T. An
*Assistant Examiner*—Nilesh Shah
(74) *Attorney, Agent, or Firm*—Sharmini N. Green (57) ABSTRACT

Embodiments of the present invention relate to methods and apparatus for managing transaction requests in a multi-node architecture. In one embodiment, a previously received ordered group request may be forwarded to a destination agent. Whether a next received ordered group request belongs to a same ordered group as the previously received ordered group request may be determined. Additionally, it may be determined whether an ordering fork is encountered if the next received ordered group request belongs to the same ordered group as the previously received ordered group request. If an ordering fork is encountered, it may be determined whether a request complete message for the previously received ordered group request has been received. If the request complete message for the previously received ordered group request has not been received and the next received ordered group request in the same ordered group is at least one of a un-ordered request and a forward-ordered request, then the next received ordered group request may be forwarded to the destination agent after the request complete message for the previously received at least one of a forward-ordered request and a sequential-ordered request issued on a different path at the ordering fork has been received.

29 Claims, 7 Drawing Sheets

U.S. PATENT DOCUMENTS

| | | | |
|---|---|---|---|
| 5,680,571 A | 10/1997 | Bauman | 395/449 |
| 5,680,576 A | 10/1997 | Laudon | 395/472 |
| 5,682,322 A | 10/1997 | Boyle et al. | 364/491 |
| 5,682,512 A | 10/1997 | Tetrick | 395/412 |
| 5,684,977 A | 11/1997 | Van Loo et al. | 395/470 |
| 5,699,500 A | 12/1997 | Dasgupta | 395/180 |
| 5,701,313 A | 12/1997 | Purdham | 371/40.2 |
| 5,701,413 A | 12/1997 | Zulian et al. | 395/200.02 |
| 5,708,836 A | 1/1998 | Wilkinson et al. | 395/800 |
| 5,710,935 A | 1/1998 | Barker et al. | 395/800 |
| 5,713,037 A | 1/1998 | Wilkinson et al. | 395/800 |
| 5,717,942 A | 2/1998 | Haupt et al. | 395/800 |
| 5,717,943 A | 2/1998 | Barker et al. | 395/800 |
| 5,717,944 A | 2/1998 | Wilkinson et al. | 395/800 |
| 5,734,921 A | 3/1998 | Dapp et al. | 395/800.1 |
| 5,734,922 A | 3/1998 | Hagersten et al. | 395/800.37 |
| 5,742,510 A | 4/1998 | Rostoker et al. | 364/468.03 |
| 5,745,363 A | 4/1998 | Rostoker et al. | 364/468.28 |
| 5,749,095 A | 5/1998 | Hagersten | 711/141 |
| 5,752,067 A | 5/1998 | Wilkinson et al. | 395/800.16 |
| 5,754,789 A | 5/1998 | Nowatzyk et al. | 395/200.63 |
| 5,754,871 A | 5/1998 | Wilkinson et al. | 395/800 |
| 5,754,877 A | 5/1998 | Hagersten et al. | 395/800.29 |
| 5,761,523 A | 6/1998 | Wilkinson et al. | 395/800.2 |
| 5,781,439 A | 7/1998 | Rostoker et al. | 364/468.28 |
| 5,784,697 A | 7/1998 | Funk et al. | 711/170 |
| 5,787,094 A | 7/1998 | Cecchi et al. | 371/53 |
| 5,793,644 A | 8/1998 | Koford et al. | 364/491 |
| 5,794,059 A | 8/1998 | Barker et al. | 395/800.1 |
| 5,796,605 A | 8/1998 | Hagersten | 365/134 |
| 5,802,578 A | 9/1998 | Lovett | 711/147 |
| 5,805,839 A | 9/1998 | Singhal | 395/292 |
| 5,815,403 A | 9/1998 | Jones et al. | 364/489 |
| 5,842,031 A | 11/1998 | Barker et al. | 395/800 |
| 5,848,254 A | 12/1998 | Hagersten | 395/383 |
| 5,857,113 A | 1/1999 | Muegge et al. | 395/830 |
| 5,860,159 A | 1/1999 | Hagersten | 711/151 |
| 5,862,316 A | 1/1999 | Hagersten et al. | 395/182.13 |
| 5,864,738 A | 1/1999 | Kessler et al. | 395/200.69 |
| 5,867,649 A | 2/1999 | Larson | 395/200.31 |
| 5,870,313 A | 2/1999 | Boyle et al. | 364/491 |
| 5,870,619 A | 2/1999 | Wilkinson et al. | 395/800.2 |
| 5,875,117 A | 2/1999 | Jones et al. | 364/491 |
| 5,875,201 A | 2/1999 | Bauman et al. | 371/49.1 |
| 5,875,462 A | 2/1999 | Bauman et al. | 711/119 |
| 5,875,472 A | 2/1999 | Bauman et al. | 711/150 |
| 5,878,241 A | 3/1999 | Wilkinson et al. | 395/379 |
| 5,878,268 A | 3/1999 | Hagersten | 395/800.28 |
| 5,881,303 A | 3/1999 | Hagersten et al. | 395/800.3 |
| 5,887,138 A | 3/1999 | Hagersten et al. | 395/200.45 |
| 5,887,146 A | 3/1999 | Baxter et al. | 395/284 |
| 5,892,970 A | 4/1999 | Hagersten | 395/825 |
| 5,897,657 A | 4/1999 | Hagersten et al. | 711/145 |
| 5,900,020 A | 5/1999 | Safranek et al. | 711/167 |
| 5,903,461 A | 5/1999 | Rostoker et al. | 364/468.28 |
| 5,905,881 A | 5/1999 | Tran et al. | 395/395 |
| 5,905,998 A | 5/1999 | Ebrahim et al. | 711/144 |
| 5,911,052 A | 6/1999 | Singhal et al. | 395/293 |
| 5,914,887 A | 6/1999 | Scepanovic et al. | 364/491 |
| 5,922,063 A | 7/1999 | Olnowich et al. | 710/132 |
| 5,925,097 A | 7/1999 | Gopinath et al. | 709/200 |
| 5,931,938 A | 8/1999 | Drogichen et al. | 712/15 |
| 5,938,765 A | 8/1999 | Dove et al. | 713/1 |
| 5,941,967 A | 8/1999 | Zulian | 710/107 |
| 5,943,150 A | 8/1999 | Deri et al. | 359/133 |
| 5,946,710 A | 8/1999 | Bauman et al. | 711/129 |
| 5,950,226 A | 9/1999 | Hagersten et al. | 711/124 |
| 5,958,019 A | 9/1999 | Hagersten et al. | 709/400 |
| 5,960,455 A | 9/1999 | Bauman | 711/120 |
| 5,961,623 A | 10/1999 | James et al. | 710/113 |
| 5,963,745 A | 10/1999 | Collins et al. | 395/800.13 |
| 5,963,746 A | 10/1999 | Barker et al. | 395/800.2 |
| 5,963,975 A | 10/1999 | Boyle et al. | 711/147 |
| 5,964,886 A | 10/1999 | Slaughter et al. | 714/4 |
| 5,966,528 A | 10/1999 | Wilkinson et al. | 395/563 |
| 5,971,923 A | 10/1999 | Finger | 600/437 |
| 5,978,578 A | 11/1999 | Azarya et al. | 395/701 |
| 5,978,874 A | 11/1999 | Singhal et al. | 710/107 |
| 5,983,326 A | 11/1999 | Hagersten et al. | 711/147 |
| 5,999,734 A | 12/1999 | Willis et al. | 395/706 |
| 6,006,251 A * | 12/1999 | Toyouchi et al. | 709/203 |
| 6,026,461 A | 2/2000 | Baxter et al. | 710/244 |
| 6,026,477 A * | 2/2000 | Kyker et al. | 712/2 |
| 6,038,646 A | 3/2000 | Sproull | 711/158 |
| 6,038,651 A | 3/2000 | VanHuben et al. | 712/21 |
| 6,041,376 A | 3/2000 | Gilbert et al. | 710/108 |
| 6,049,845 A | 4/2000 | Bauman et al. | 710/113 |
| 6,049,853 A | 4/2000 | Kingsbury et al. | 711/147 |
| 6,052,760 A | 4/2000 | Bauman et al. | 711/119 |
| 6,055,617 A | 4/2000 | Kingsbury | 711/203 |
| 6,065,037 A | 5/2000 | Hitz et al. | 709/200 |
| 6,065,077 A | 5/2000 | Fu | 710/100 |
| 6,081,844 A | 6/2000 | Nowatzyk et al. | 709/233 |
| 6,085,295 A | 7/2000 | Ekanadham et al. | 711/145 |
| 6,092,136 A | 7/2000 | Luedtke | 710/107 |
| 6,092,156 A | 7/2000 | Schibinger et al. | 711/145 |
| 6,094,715 A | 7/2000 | Wilkinson et al. | 712/20 |
| 6,108,739 A | 8/2000 | James et al. | 710/113 |
| 6,119,215 A | 9/2000 | Key et al. | 712/19 |
| 6,141,733 A | 10/2000 | Arimilli et al. | 711/141 |
| 6,148,361 A | 11/2000 | Carpenter et al. | 710/260 |
| 6,155,725 A | 12/2000 | Scepanovic et al. | 395/500.1 |
| 6,161,191 A | 12/2000 | Slaughter et al. | 714/4 |
| 6,167,489 A | 12/2000 | Bauman et al. | 711/145 |
| 6,171,244 B1 | 1/2001 | Finger et al. | 600/437 |
| 6,173,386 B1 | 1/2001 | Key et al. | 712/10 |
| 6,173,413 B1 | 1/2001 | Slaughter et al. | 714/6 |
| 6,182,112 B1 | 1/2001 | Malek et al. | 709/201 |
| 6,189,078 B1 | 2/2001 | Bauman et al. | 711/156 |
| 6,189,111 B1 | 2/2001 | Alexander et al. | 714/8 |
| 6,199,135 B1 | 3/2001 | Maahs et al. | 710/129 |
| 6,199,144 B1 | 3/2001 | Arora et al. | 711/145 |
| 6,205,528 B1 | 3/2001 | Kingsbury et al. | 711/170 |
| 6,209,064 B1 | 3/2001 | Weber | 711/141 |
| 6,212,610 B1 | 4/2001 | Weber et al. | 711/164 |
| 6,226,714 B1 | 5/2001 | Safranek et al. | 711/119 |

* cited by examiner

| Ordering Type | Ordering Semantic | Ord[1] | Ord[0] |
|---|---|---|---|
| Un-Ordered | unorder | 0 | 0 |
| Forward-Ordered | fworder | 0 | 1 |
| Backward-Ordered | bworder | 1 | 0 |
| Sequentially Ordered | sorder | 1 | 1 |

METHOD AND APPARATUS FOR MANAGING TRANSACTION REQUESTS IN A MULTI-NODE ARCHITECTURE

FIELD OF THE INVENTION

Embodiments of the present invention relate to a computer system having a multi-node computer architecture. In particular, the present invention relates to a method and apparatus for managing transaction requests in a multi-node architecture.

BACKGROUND

Computer systems may contain multiple processors that may work together to perform a task. For example, a computer system may contain four processors that may share system resources (e.g., input devices or memory devices) and may perform parallel processing. The processors may send messages to each other, may send messages to system resources, and may receive messages from the system resources. For example, such messages may include requests for information that is stored at a location in a memory device (i.e., read requests) or a request to store information in a location of a memory device (i.e., write requests).

The processors may share multiple system resources (e.g., memory) and multiple independent paths to these system resources for exchanging messages and requests. In some cases, the existence of these distributed resources and paths may result in reordering of messages or requests in a multi-node architecture. For example, a first processor may issue write requests for updating data to a memory address location in another node. However, before the request is completed, if a second processor issues another request to read data from the memory address location, the second processor may read data that is "stale" or has become outdated. This situation becomes complicated in a multiple node architecture having distributed memory resources.

For example, consider a case where memory locations "A" and "B" in a memory resource have initial conditions or values of "10" and "False," respectively (i.e., A=10 and B="False"). Agent A such as a node controller of one of the processor nodes in the multi-node architecture may issue requests to write to memory locations A and B in the memory resource located, for example, in another node. Such requests may be, for example, "WR A=20" (i.e., write to location A the value 20) followed by "WR B= True" (i.e., write to location B the value True). Before the write requests issued by Agent A are executed, Agent B such as a node controller of another processor node may issue a request to the same memory location such as "if (B=True) RD A" (i.e., if the value of location B is True, then read the value of location A). If the receiving agent containing the memory resource receives and executes "WR B=True" from Agent A before "WR A= 20" from Agent A and the requests issued by Agent B ("if (B=True) RD A") are executed before "WR A=20" request from Agent A, then Agent B may not receive the correct value of location A since the value of location B has been updated but the value of location A is not updated.

DETAILED DESCRIPTION

Embodiments of the present invention relate to methods and apparatus for managing transaction requests in a multi-node architecture.

In an embodiment of the present invention, a receiving agent may establish ordering semantics for transaction requests issued by a requesting agent. The ordering semantics may specify an order for processing the transaction requests. The requesting agent may forward requests having the ordering semantics to a receiving agent. The receiving agent receives a first request and may forward the request to a destination agent. The receiving agent may receive a subsequent request and examines the subsequent request. The receiving agent may determine whether the next request belongs to the same ordered group as the previous request. If the next request does not belong to the same ordered group as the previous request, the next request is forwarded to the destination agent for processing.

If, on the other hand, the next request does belong to the same ordered group as the previous request, then if an ordering fork has been encountered and no request complete message has been received for the previous request, the receiving agent forwards the next request to the destination agent based on semantic ordering. The receiving agent may examine the request to determine if the next request is either un-ordered, forward-ordered, backward-ordered, or sequentially ordered with respect to the previous request. Based on results of this ordering examination, the receiving agent may wait for a request complete message from the destination agent before sending the next request to the destination node for processing. After the awaited request complete message for the previous request has been received, the receiving agent forwards the next request to the destination agent for processing. After the request has been forwarded to the destination agent, the receiving agent examines the subsequent request in the ordered group to process the subsequent request based on the semantic ordering of the request.

If the next request does belong to the same ordered group as the previous request, then if an ordering fork has not been encountered or if the ordering fork has been encountered but a request complete message has been received for the previous request, no ordering is required with respect to the previous request. The receiving agent forwards the next request to the destination agent for processing. After the request has been forwarded to the destination agent, the receiving agent examines the subsequent request in the ordered group to process the subsequent request based on the semantic ordering of the request.

Figure 1:
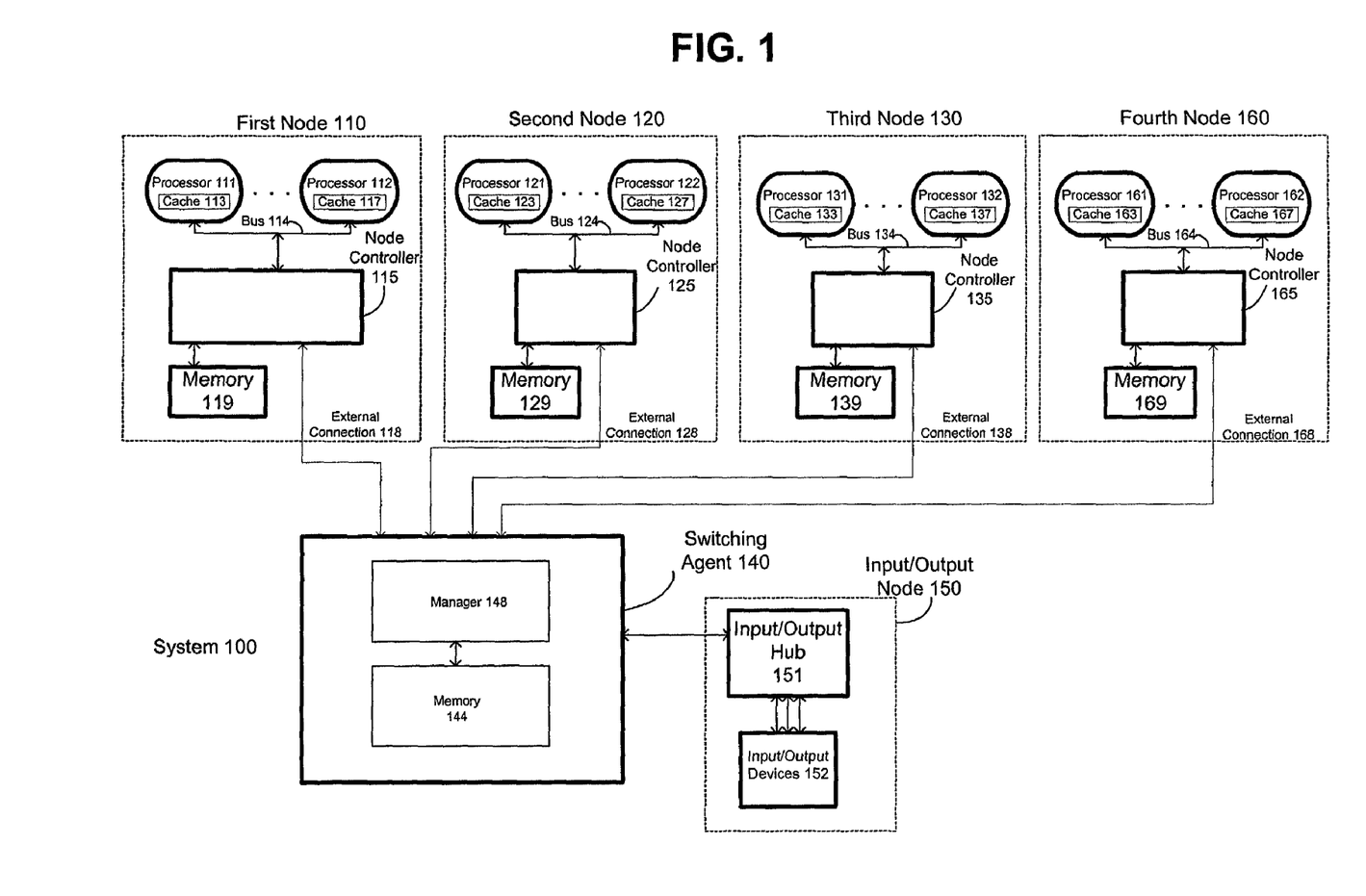
FIG. 1 is a partial block diagram of a system having an agent that manages memory requests in accordance with an exemplary embodiment of the present invention.

FIG. 1 is a partial block diagram of a system having an agent that manages memory requests according to embodiments of the present invention. FIG. 1 shows a system 100 that is a computer system that includes processors, memory devices, and input/output devices. Components in system 100 are arranged into architectural units that are referred to herein as "nodes" and/or "agents." It is recognized that any of the components shown in system 100 could be referred to as nodes and/or agents, and that any of these components could perform the functions of a "node" or an "agent" as described herein. A system that has multiple nodes may be referred to as a "multinode" system.

In one embodiment of the present invention, each node may contain one or more processors, memories, or input/output devices. The components within a node may be connected to other components in that node though one or more busses or lines. In addition, each node in system 100 has an external connector that may be used by the components within that node to communicate with components in other nodes. In one embodiment, any communication from a component within a first node to another node must be routed though the external connection for the first node. In system 100, the external connection for each node is connected to a switching agent 140. In an alternative embodiment of the present invention, each of the nodes may communicate with other nodes through direct connections (not shown) that do not pass through switching agent 140.

In embodiments of the present invention, the switching agent 140 could be implemented in a central switch for all nodes (as shown in FIG. 1) or, alternatively, the switching agent could be implemented in a distributed manner integrated in one or more node controllers of the node(s). Optionally and/or additionally, the switching agent could be implemented in a distributed manner and integrated within the intelligence of one or more processors and/or within an input/output hub located in system 100.

The nodes in system 100 may send messages that are directed to a processor or resource in another node. For example, one node may send a request to read from a memory location in another node or write to particular location in memory in another node. Similarly, a node and/or switching agent 140 may send a request to snoop the caches in the other nodes. In one embodiment, all requests in system 100 from one node to another node may be sent to switching agent 140, and switching agent 140 may send requests to other nodes based on the first request. For example, switching agent 140 may receive a request from a first node to read or write data to a particular memory location, and switching agent 140 may send snoop requests to the other nodes in system 100 as needed to carry out the received request from the first node. The snoop requests may be sent by the switching agent to determine the status of data in other nodes prior to completing the request from the first node. Alternatively, a node may send requests to another node without sending the same request to the switching agent 140.

The details shown in FIG. 1 will now be discussed. As shown in FIG. 1, system 100 includes, for example, a first node 110, a second node 120, a third node 130, a fourth node 160 and an input/output node 150. Each of these nodes is coupled to switching agent 140. The term "coupled" encompasses a direct connection, an indirect connection, an indirect communication, etc. First node 110 is coupled to switching agent 140 through external connection 118, second node 120 is coupled to switching agent 140 through external connection 128, third node 130 is coupled to switching agent 140 through external connection 138, and fourth node 160 is coupled to switching agent 140 through external connection 168. External connections 118, 128, 138 and 168 may be one or more lines capable of communicating information to and from the node. In embodiments of the invention, the nodes may be coupled to each other through direct connections (not shown). First node 110 includes processors 111,112, and node controller 115, which are coupled to each other by bus 114. Processor 111 and processor 112 may be any micro-processors that are capable of processing instructions, such as for example a processor in the INTEL PENTIUM™ family of processors manufactured by Intel Corporation, of Santa Clara, Calif. Bus 114 may be a shared bus. First node 110 also contains a memory 119 that is coupled to node controller 115. Memory 119 may be, for example, a Random Access Memory (RAM). Processor 111 may contain a cache 113, and processor 112 may contain a cache 117. Cache 113 and cache 117 may be Level 2 (L2) cache memories that are comprised of static random access memory (SRAM). Of course, first node 110 may include processors additional to the processors shown (e.g., 111, 112).

Similarly, second node 120 contains processors 121, 122 and node controller 125 that are coupled to each other by bus 124. Second node 120 also contains a memory 129 that is coupled to node controller 125. Third node 130 contains processors 131, 132 and node controller 135 that are coupled to each other by bus 134. Third node 130 also contains a memory 139 that is coupled to node controller 135. Fourth node 160 contains processors 161, 162, and node controller 165 that are coupled to each other by bus 164. Fourth node 160 also contains a memory 169 that is coupled to node controller 165. Processors 121, 122 may contain cache 123, 127, respectively. Processors 131, 132 may contain cache 133, 137, respectively. Processors 161, 162 may contain cache 163, 167, respectively. Processors 121, 122, 131, 132, 161, and 162 may be similar to processors 111 and 112. In an embodiment, two or more of processors 111, 112, 121, 122, 131, 132, 161 and 162 are capable of processing a program in parallel. System 100 may include additional nodes, and each of the nodes (e.g., 110, 120, 130, 160, etc.) may include processors additional to the ones shown (e.g., 111, 112, 121, 122, 131, 132, 161, 162). Node controllers 125, 135, 165 may be similar to node controller 115, and memory 129, 139, 169 may be similar to memory 119.

In an embodiment, switching agent 140 may be a routing switch for managing read and/or write requests, and for routing other messages within system 100. As shown in FIG. 1, switching agent 140 contains request manager 148 and memory 144 and may contain other components (not shown). Request manager 148 may manage and regulate requests passed among nodes 110, 120, 130, and 160.

In an embodiment of the present invention, request manager 148 may monitor read and writes to memory locations (e.g., in cache and main memory) that may occur in system 100. Request manager 148 may maintain ordering between requests exchanged in the multi-node system 100. For example, to prevent "stale" information from being read in system 100, request manager 148 may permit a request issued earlier to be executed before a later issued request. In addition, request manager 148 may permit ordered requests to be executed based on semantic ordering established by a node controller. It is recognized that switching agent 140 that includes the request manager 148 may be distributed in any of the components shown in system 100. Accordingly, any of the node controllers, for example, controller 115, 125, 135 and/or 165, and/or any of the processors, for example, processors 111, 112, 121, 122, 131, 132, 161, and/or 162, and/or input output hub 151 may also manage or maintain ordering between read and/or write requests in accordance with embodiment of the present invention.

As shown in FIG. 1, input/output node 150 contains an input/output hub 151 that is coupled to one or more input/output devices 152. Input/output devices 152 may be, for example, any combination of one or more of a printer, keyboard, mouse, or any other input/output device. Input/output hub 151 may by an integrated circuit that contains bus interface logic for interfacing with a bus that complies to, for example, the Peripheral Component Interconnect (PCI) standard. PCI Special Interest Group (SIG) PCI Local Bus Specification, Revision 2.2, published Dec. 18, 1998. Input/output hub 150 may be similar to, for example, the INTEL 82801AA I/O Controller Hub.

In an embodiment, node controller 115, switching agent 140, and input/output hub 151 may be a chipset that provides the core functionality of a motherboard, such as a modified version of a chipset in the INTEL 815 family of chipsets.

In a further embodiment, inter-node communication in system 100 may be asynchronous (i.e., there is no fixed timing between events). In a still further embodiment, inter-node communication may be sent in the form of packets that may contain a header or a header and data sections. An example of a message size may be 144 bits. In an embodiment, the messages sent may include requests and responses. In a further embodiment, the types of requests that the nodes may send and receive may include a memory read request, memory write request, cache snoop request, cache flush request, memory update request, cache line replacement request, input/output port read request, and input/output port write request. Requests may contain fields such as a packet type, destination ID, request type, node ID, transaction address, request length, stream ID, and ordering semantics.

In an embodiment of the present invention, the processors in nodes 110, 120, 130 and 160 may be shared memory multi-processors, and each of the memories 119, 129, 139 and 169 may be part of the same shared physical address space. In a further embodiment, the processors in nodes 110, 120, 130 and 160 communicate with each other through shared memory reads and writes (i.e., by writing to and reading from memory 119, 129, 139, and 169). In a further embodiment, the processors in nodes 110, 120, 130 and 160 each have one or more caches (e.g., Level 1 and Level 2 caches), and these caches may be kept coherent using the switching agent 140. For example, when processor 111 accesses a location in memory 119, it may send a snoop request for that memory location to switching agent 140, which may determine if any of the processors in second node 120, third node 130 or fourth node 140 have cached that memory location. A snoop request may be generated when a processor needs other processors in the system to look in their own caches to see if a particular line is present in their cache.

Figure 2:
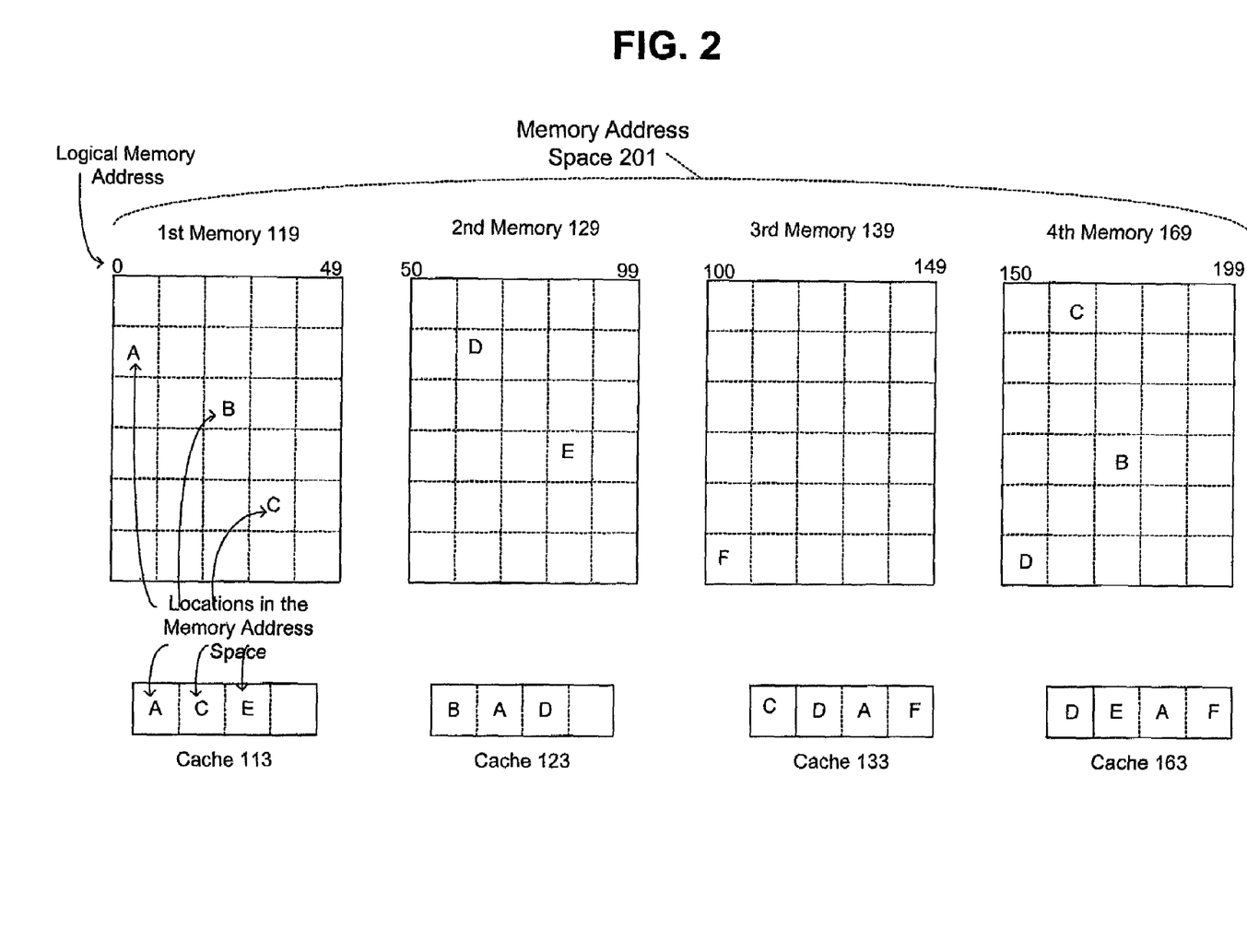
FIG. 2 is a partial block diagram showing a memory address space for a multi-node system in accordance with embodiments of the present invention.

FIG. 2 is a partial block diagram showing distributed memory address space 201 and caches for a multi-node system according to an embodiment of the present invention. Memory address space 201 includes first memory 119, second memory 129, third memory 139, and fourth memory 169 which are shown respectively in first node 110, second node 120, third node 130 and fourth node 160 in FIG. 1. For the purpose of illustration, first memory 119 is shown as containing the addresses 0 to 49, second memory 129 is shown as containing the addresses 50 to 99, third memory 139 is shown as containing the addresses 100 to 149, and fourth memory 169 is shown as containing the addresses 150 to 199. Thus, in this embodiment, address space 201 contains the locations in addresses 0 to 199. Of course, in other embodiments address space 201 may contain other addresses, and address space 201 may be spread across more or less memories than as shown in FIG. 2. Address space 201 may be referred to as a "shared" address space because any node in the multi-node system may address any location in address space 201. Thus, second node 120 may send a request to read from location 0 in the address space, location 0 being contained in memory 119 in first node 110.

FIG. 2 also shows caches 113, 123, 133, and 163 which are contained in first node 110, second node 120, third node 130 and fourth node 160 of FIG. 1, respectively. The multi-node system may contain additional caches than shown in FIG. 2 (such as caches 117, 127, 137 and 167 of FIG. 1). In an embodiment, each addressable location of memory in address space 201 may be the size of a cache line in caches 113, 123, 133, and 163. In FIG. 2, certain locations in the memory address space 201 are designated as A, B, C, D, E and F for the purposes of reference. Each of these locations stores some information (data or instructions).

The information in any particular location in the memory address space 201 may be cached in one or more of the caches in the system. Thus, a copy of the information in the location designated A in first memory 119 is cached in caches 113, 123, 133, and 163; a copy of the information in the location designated B in first memory 119 is cached in cache 123; a copy of the information in the location designated C in first memory 119 is cached in caches 113, and 133; a copy of the information in the location designated D in second memory 129 is cached in cache 123, 133 and cache 163; a copy of the information in the location designated E in second memory 129 is cached in cache 113 and 163; and a copy of the information in the location designated F in third memory 139 is cached in cache 133 and 163.

Switching agent 140 may process requests as follows. If switching agent 140 receives from first node 110 a request to access the memory location designated as D (in FIG. 2), request manager 148 may determine that memory location D is cached in cache 123 (in second node 120), cache 133 (in third node 120), and cache 163 (in fourth node 169). Request manager 148 may then cause snoop requests that are associated with location D to be sent to second node 120, third node 130, and fourth node 160.

Figure 3:
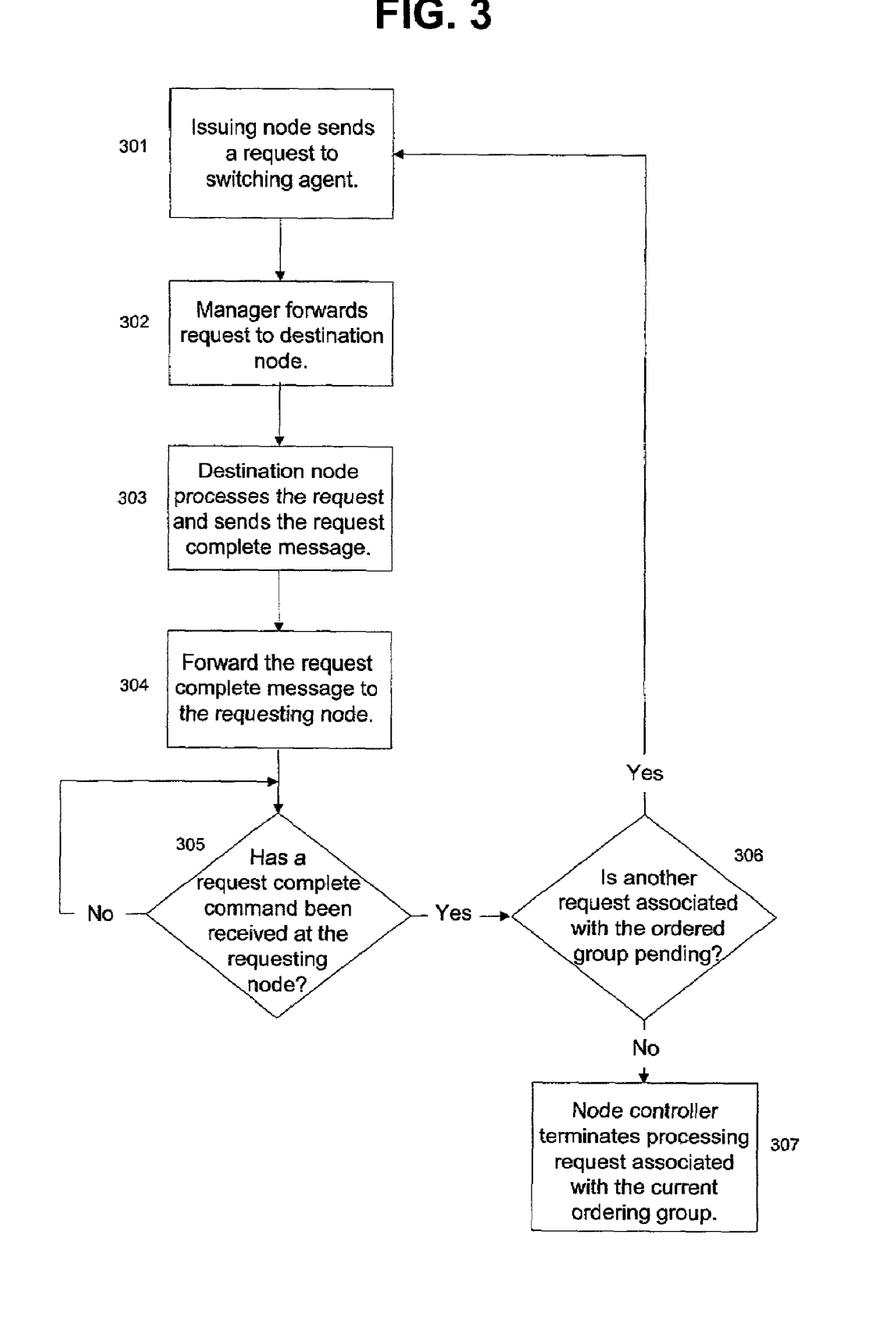
FIG. 3 is a flow diagram of a method of managing requests in a multi-node system.

FIG. 3 is a flow diagram of a method of managing transaction ordering in a multi-node system. The method shown in FIG. 3 may be controlled by a requesting node or agent, such as a node controller 115, 125, 135, and/or 165 or processors 111, 112, 123, 127, 131, 137, 163, and/or 167 as shown FIG. 1.

Transaction ordering may be desirable in a multi-node system to ensure that most current data is being written or read by the request manager 148 in response to requests from nodes in system 100. In this example, node 110 may issue a group of ordered requests to switching agent 140 to write data A, B, C, to memory locations of nodes 120, 130 and 160, respectively. For this group of requests, it may be desirable that each request be completed in the specified order. For example, first request "WR A= 10" (i.e., write to location A the value 10) may need to be completed before second request "WR B=20" (i.e., write to location B the value 20) that may need to be completed before the third request "WR C=30" (write to location C the value 30).

To maintain ordering, node controller 115 of first node 110 may issue a first write request, for example, "WR A=10" to manager 148 of switching agent 140 (301). The request may include, for example, appropriate source and destination identifiers (IDs) to identify the requesting node and the destination node for the request. Manager 148 may receive the request from node 110 and, after determining the identity of the destination node, may forward the request to, for example, destination node 120 (302). Destination node 120 may receive, for example, the write request and may write the value "10" to an appropriate memory location in memory location "A."

After the request has been processed by destination node 120, a request complete message may be sent to the manager 148 (303). Manager 148 may forward the request complete message to the issuing node 120 (i.e., source node) (304). In alternative embodiments, the destination node may send the request complete message to the issuing node directly. The node controller 115 for the issuing node 120 may determine whether the request complete message has been received for the first issued request (305). If the request complete message has not been received, the node controller 115 may continue to check its receipt (305).

If the request complete message associated with the first issued request has been received, node controller 115 may determine whether another request associated with the ordered group is pending (305 and 306). If another request is not pending, the node controller terminates processing requests associate with the current group and may continue to process other requests or perform other tasks (307).

If another request is pending, for example second request, "WR B=20," node controller 115 may send the second request to switching agent 140 (306 and 301). The process as shown by steps 301–307 may continue until all of the requests related to the current group are completed. Accordingly, transactions can be processed in a multi-node system in an embodiment of the present invention.

Figure 4:
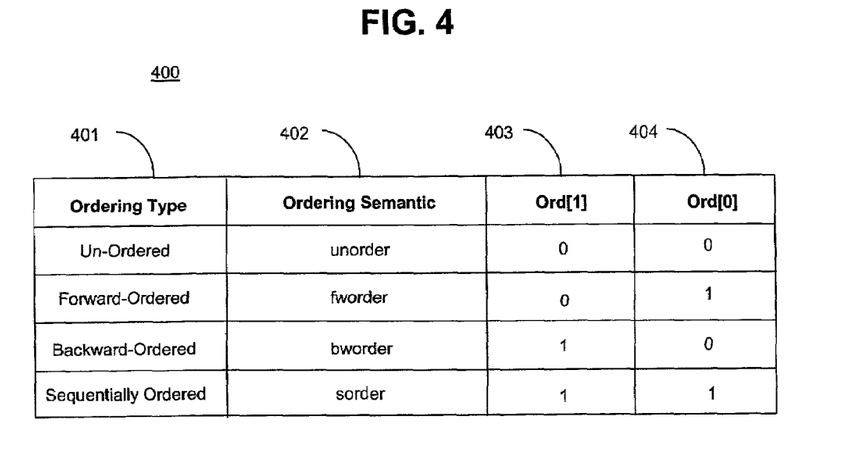
FIG. 4 is a table showing ordering semantics and corresponding ordering bits in accordance with embodiments of the present invention.

FIG. 4 shows a table 400 listing the types of ordering semantics and corresponding bits that may represent these ordering semantics in embodiments of the present invention. In embodiments of the present invention, ordering semantics may be exported with each transaction request. Ordering semantics may define, for example, rules by which a transaction or request is allowed to be processed or completed before another transaction. As listed in columns 401, types of ordering semantics may include, for example, un-ordered, forward-ordered, backward-ordered, and sequentially-ordered semantics. As indicated above, the semantic orders may specify a permissible order sequence for processing the transaction requests. Columns 402–404 list corresponding command representations as well as bit representations (e.g., Ord[0], Ord[1]) for each type of ordering semantic. For example, a request having a forward-ordered designation may be coded as "req<fworder>" and may be pre-pended with first two bits of the request being represented as 1 and 0, where the first bit 404 Ord[0]=1, and the second bit 403 Ord[1]=0.

Figure 5:
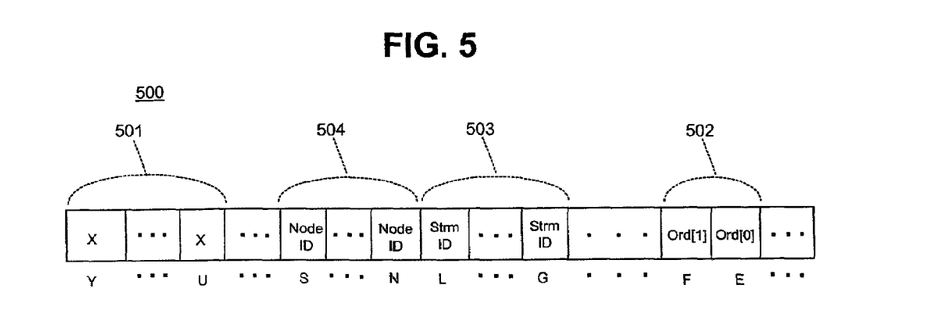
FIG. 5 is a diagrammatic representation of a data packet of a semantically ordered request in accordance with embodiments of the present invention.

FIG. 5 shows an example of a request data packet 500 that may be created by, for example, a node controller or switching agent 140 in response to transaction request from a node. As shown, request data packet 500 may have bits in locations as shown, as well as additional bits in locations not shown. The bits in locations E and F, may be the ordering bits Ord[0] and Ord[1] 502 indicating the semantic ordering established by the node controller. As indicated in columns 403 and 404 of FIG. 4, the appropriate combination of the bits 0 and 1 can be inserted in locations E and F of data packet 500 to indicate the particular semantic ordering type of the request. In embodiments of the invention, the data packet 500 may be, for example, 32 bits, 64 bits, 144 bits, etc.

Request data packet 500 may include bits 503 in locations G through L that may include a stream identifier (StrmID) created by a node controller to indicate that the data packet 500 belongs to a particular ordered stream. Data packet 500 may include bits 504 in locations N through S that may include node identifier (NodeID) which designates the identity of the requesting or sending node that originated the request. Requests that have the same StreamID and/or the same NodeID belong to the same orderd group. Collectively, the StrmID and the NodeID may be referred to herein as an ordered group identifier. Data packet 500 may include additional bits 501 in locations U through Y that may carry other header and/or payload information related to the request. For example, header information may include a destination node ID indicating the identity of the node where the request is to be delivered (i.e., destination node). Data packet 500 may contain additional fields such as a packet type, request type, transaction address, request length, etc.

Now, each of the semantic ordering types will be described in more detail. An un-ordered request transaction (req<unorder>) may have no specific ordering designation. An un-ordered transaction may be allowed to pass other un-ordered transaction and can be executed as it is received by a request manager, node controller or other processing device. A forward-ordered request transaction (req<fworder>) may be ordered with respect to all future request transactions, thus, request transactions issued in the future (i.e., issued after the forward-ordered request) may not be allowed to be executed ahead of the forward-ordered request transactions. A backward-ordered request transaction (req<bworder>) may be ordered with respect to all the previously issued or previously received request transactions, thus, later issued request transactions having backward-ordered semantics may not be allowed to be executed ahead of the earlier issued request transactions (i.e., issued before the backward ordered request transaction). A sequentially or strictly-ordered request transaction (req<sorder>) is both forward and backward-ordered with respect to other request transactions.

Figure 6:
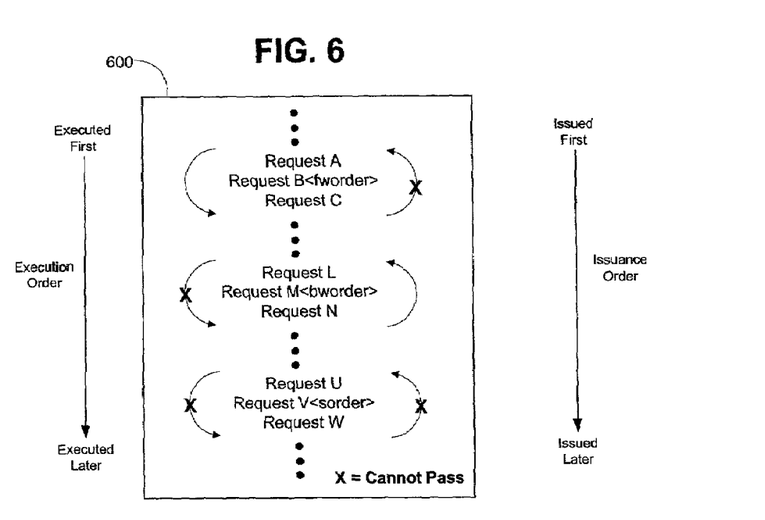
FIG. 6 illustrates processing orders for semantically ordered requests in accordance with embodiments of the present invention.

FIG. 6 shows a listing 600 illustrating the ordering relationship among semantically ordered transaction requests in accordance with embodiments of the present invention. For example, node 110 may issue Request A through Request W. Requests A through W may be read requests, write requests, other suitable requests, or any combination thereof. The requests may be issued, for example, by processors 111 through 112 to node controller 115. Node controller may establish semantic ordering for each request and send the request or a group of requests to a request manager 148 or to another node such as destination agent.

In this example, Request A may be issued before Request B which is issued before Request C, and so on. As further shown, issue order starts from top to bottom, thus Request A is ahead of Request B in issue order, Request B is ahead of Request C, and so on. Of course, based on established semantic ordering for each request, actual processing order may be different. Requests that are listed without semantic ordering would typically considered as un-ordered (i.e., Req<unorder>).

Node controller 115 in conjunction with one or more of the processors 111 through 112 may establish semantic ordering for the issued requests. In embodiments of the invention, manager 148 based on the established ordering semantics may forward the requests to the appropriate node for processing. In alternative embodiments of the invention, one of the node controllers such as controller 115 may forward the ordered requests to the appropriate node or destination agent for processing. For example, Request B may be established with a forward-ordering (fworder), thus future request transactions may not be allowed to be processed ahead of the forward-ordered request transaction. As indicated, since Request C was issued after (i.e., in the future) Request B<fworder>, thus, Request C cannot pass or be processed before Request B<fworder>(as indicated by the X). Since Request A is not ordered with respect the other requests, Request B<fworder>can pass or be processed before Request A.

In another example, Request M may be established with backward-ordering (bworder), thus, this backward-ordered request can not be processed ahead of any earlier issued request. As indicated, since Request L was issued before (i.e., earlier than) Request M<bworder>, thus, Request M<bworder> may not pass or be processed before Request L (as indicated by the X). Since Request N is issued after (i.e., not earlier than) Request M<bworder>, thus, Request N can pass or processed before Request M<bworder>.

Referring again to FIG. 6, Request V may be established with sequential-ordering (sorder) indicating that no other request can pass the sequential-ordered request. Sequential-ordering may indicate that the corresponding request should be executed in the specified order in which the sequential-ordered request was issued. Thus, a sequential-ordered request may be considered to have a strict ordering relationship with respect to other issued requests. For example, since Request W was issued after Request V<sorder>, thus, Request W may not be executed before Request V<sorder> (as indicated by the X). Since Request U has been issued before Request V<sorder>, thus, Request V<sorder> may not be executed before Request U (as indicated by the X).

Figure 7:
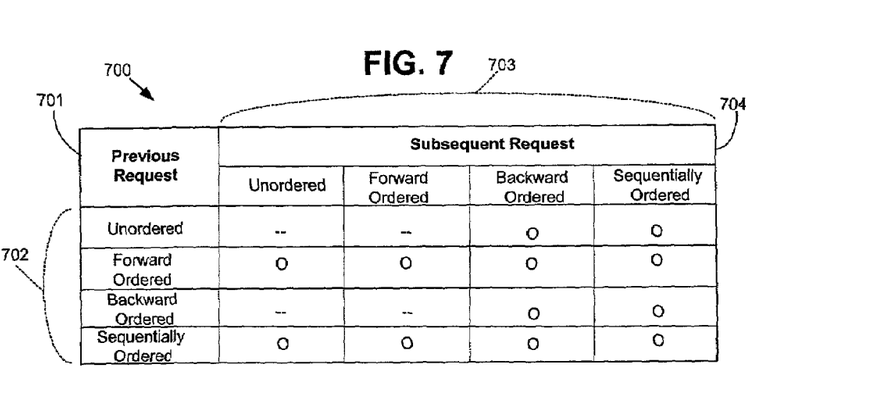
FIG. 7 is a semantic ordering relationship matrix in accordance with embodiments of the present invention.

FIG. 7 shows a table 700 indicating the ordering relationships between transactions that belong to the same ordered group. Table 700 shows relationships between previous requests 701 having ordering semantics 702 and subsequent requests 704 having ordering semantics 703.

An "O" entry in the table 700 may indicate that the subsequent request 704 with the corresponding ordering semantics 703 is ordered with respect to the previous request 701 with corresponding ordering semantics 702. Accordingly, these ordered requests must be processed in accordance with the ordering semantics. For example, a backward-ordered subsequent request 704 is ordered (i.e., designated with an O) with respect to all previously issued and/or previously received request transactions 701, so backward ordered subsequent requests should be processed after the earlier requests have been processed. In another example, a forward-ordered subsequent request 704 is ordered (i.e., designated with an O) with respect to a sequentially-ordered previous request 702, so the sequentially-ordered previous request should be processed before the forward-ordered subsequent request. Also, the forward-ordered subsequent request 704 is ordered (i.e., designated with an O) with respect to a forward-ordered previous request 701, so the forward-ordered previous request should be processed before the forward-ordered subsequent request.

Referring again to table 700, a "--" indicates that the requests having the indicated semantic ordering are not ordered with respect to each other and they can be processed in any order at the destination node. For example, a forward-ordered subsequent request 704 can be processed in any order with respect to an un-ordered and/or a backward-ordered previous request 701. Now the operation of an embodiment of the present invention relating to semantically ordered requests will be described referring to the flow chart shown in FIG. 8 and block diagram shown in FIG. 9.

Figure 8:
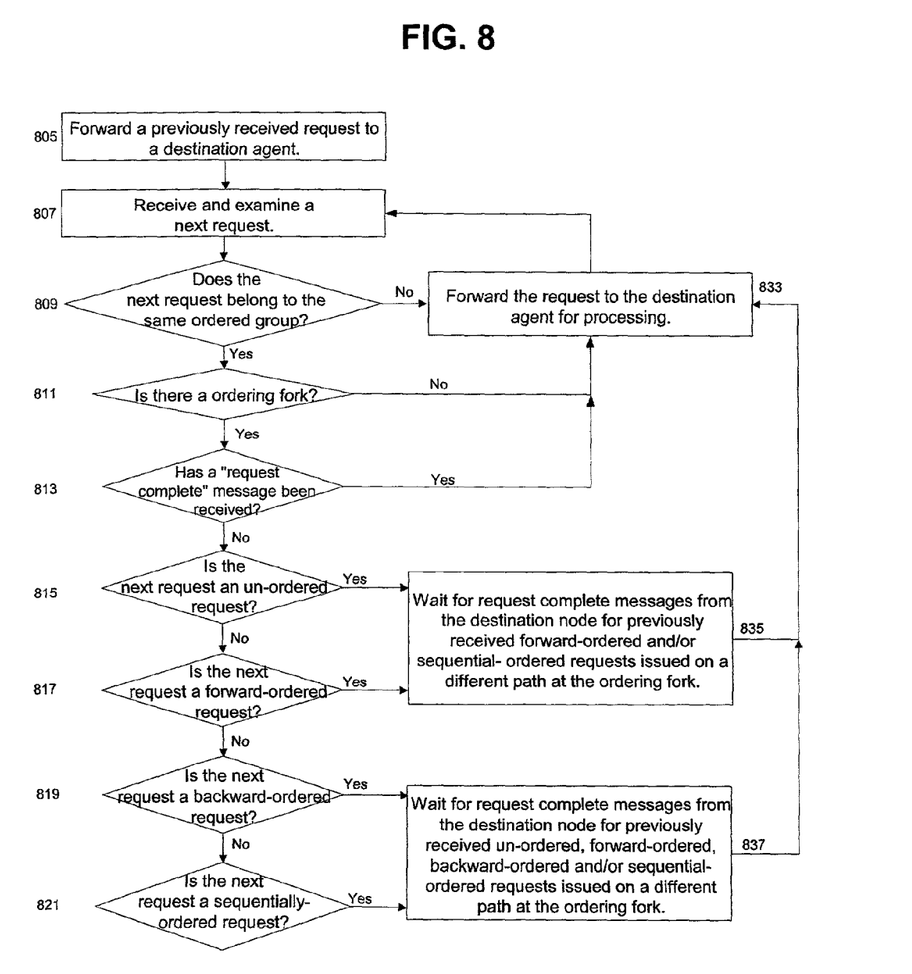
FIG. 8 is a flow diagram of a method of managing requests in a multi-node system in accordance with embodiments of the present invention.

The flow chart of FIG. 8 describes a method for managing transaction requests in a multi-node architecture in accordance with embodiments of the present invention. In embodiments of the present invention, ordering semantics may be exported with each transaction request. Ordering semantics may define, for example, rules by which a transaction or request is allowed to be processed or completed before another transaction at the receiving agent.

Figure 9:
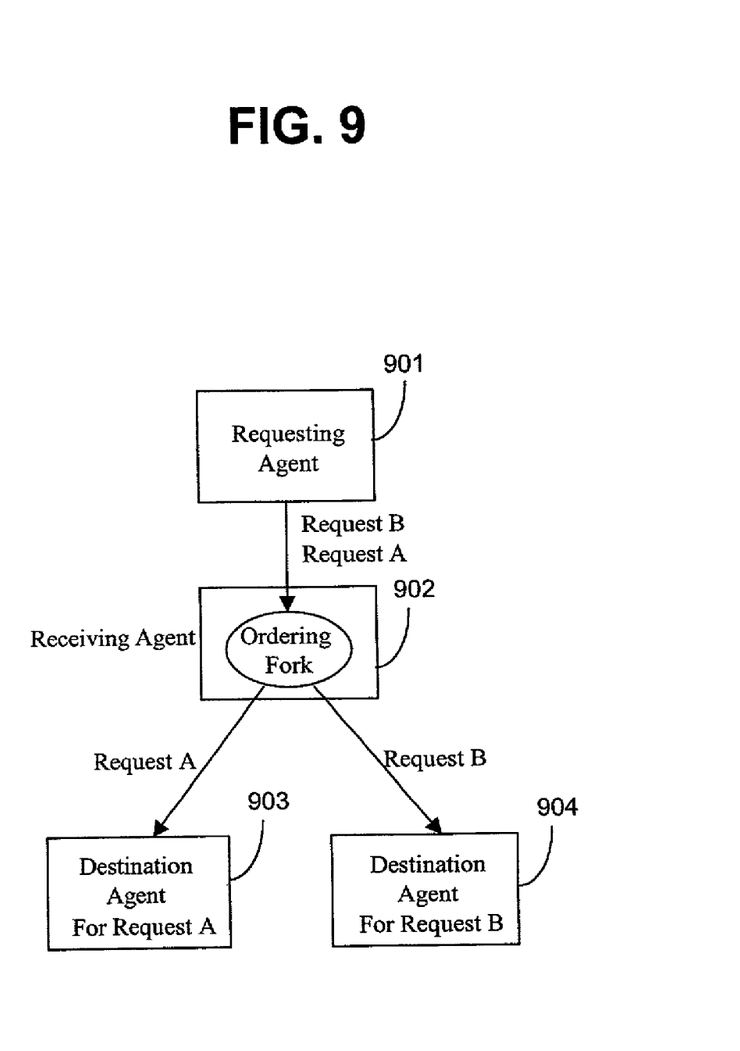
FIG. 9 is a simplified block diagram of the system shown in FIG. 1 in accordance with an exemplary embodiment of the present invention.

For ease of illustration, FIG. 9 is a simplified version of system 100 shown in FIG. 1. FIG. 9 shows a requesting agent 901 that is coupled with receiving agent 902. The receiving agent 902 may be further coupled to destination agent 903 and destination agent 904. It is recognized that requesting agent is indirectly coupled to both destination agents 903, 904 through receiving agent 902.

Requesting agent 901 may be any node or component in system 100 that sends requests (e.g., read and/or write requests) to another node or component in the system. For example, any of the nodes such as first node 110 or the input/output node 150 may be the requesting agent 901. It is recognized that any one of the processors, for example, processor 122 and/or one of the controllers such as node controller 135 can be the requesting agent.

Receiving agent 902 may be any node or component in system 100 that receives requests from the requesting agent 901. For example, any of the node controllers such as controller 125, or any of the processors such as processor 163, and the switching agent 140 can be a receiving agent 902. In alternative embodiments of the present invention, the input/output node 150 may be the receiving agent.

Destination agents 903, 904 may be one or more nodes or components in system 100 that are the designated destination for the particular request. For example, any of the processors such as processors 131 and/or processors 161 can be the destination agents. In embodiments of the invention, switching agent 140 and/or input/output node 150 may be destination agents.

Referring to FIGS. 8 and 9, requesting agent 901 sends one or more requests (e.g., Request A, Request B, etc.) to receiving agent 902. The request may be a single request or a group of ordered requests. A group of ordered requests are requests that have the same StreamID and/or the same requesting NodeID.

In an exemplary embodiment of the present invention, the request(s) may be issued by one or more processors 111 to 112 to, for example, the node controller 115. Node controller 115 may generate for each request, a request data packet 500 including data representing, for example, a request type, Node ID, a destination ID, a stream ID and established semantic ordering information (e.g., ordering bits Ord[0] and Ord[1]). Requests that belong to the same ordered group may share the same StreamID and/or same NodeID. Node controller 115 may send the generated request data packet 500 for each request to receiving agent 902 or alternatively, node controller, acting as the receiving agent 902, may examine the request and send the request to the appropriate destination agent 903, 904.

Receiving agent 902 receives the request(s), for example, Request A from requesting agent. In one example, a switch manager such as manager 148 will manage the received request(s) for the receiving agent (e.g., switching agent 140). In alternative embodiments of the invention, the node controller 115, for example, or input/output node 150 may manage the received requests. As referred to herein, Request A, Request B, etc. each include the request data packet 500 with information corresponding to its respective request.

Receiving agent 902 forwards a previous received request, for example, Request A to its destination agent for processing (805). For example, the destination agent for Request A may be agent 903. Receiving agent 902 receives and examines the next or subsequent request, for example, Request B whose destination node may be agent 904 (807).

Receiving agent 902 determines whether the subsequent request (e.g., Request B) and the previously received request (Request A) belong to the same ordered group (809). As indicated above, requests belong to the same ordered group if they have the same StreamID and/or the same requesting NodeID. If the subsequent request does not belong to same ordered group as the previous request, then there is no ordering requirement between the requests and the receiving agent 902 forwards the next request towards the destination agent, for example, agent 904 (833).

If the next request belongs to the same ordered group as the previous request, then the requests must be processed in the proper order and the receiving agent 902 determines whether an "ordering fork" exists between the subsequent request and the previously received request (811). The term "ordering fork" as used herein, may refer to a point at the receiving agent 902 where a request stream is split into multiple separate streams and ordering between these streams can not be guaranteed. In other words, an ordering fork exists at a receiving agent when requests that belong to the same ordered group are being sent to different destinations. Accordingly, a "fork" is encountered where a first request is sent to one destination while a subsequent request, in the same ordered group, is being sent to another destination. Thus, in this example, Request A and Request B belong to the same ordered group, but have different destinations. For example, Request A is destined for agent 903 and Request B is destined for agent 904. Therefore, in this example, with respect to Request A and Request B, an "ordering fork" is encountered at the receiving node.

In embodiments of the present invention, if an ordering fork does not exist (i.e., requests that belong to the same ordered group are being sent to the same destination agent), then the receiving agent 902 forwards the subsequent request towards the designated destination agent (833). The destination agent receives requests that belong to the same ordered group and processes them in the order in which they were received.

If in step 811, an ordering fork exists, receiving agent 902 determines whether a "request complete" message has been received for the previously sent request that belongs to the same ordered group, for example, Request A (813). A request complete may be sent by a destination agent to indicate that the previously sent request has been completed. If the request complete message has been received by the receiving agent 902, then the receiving agent 902 may forward the next request that belong to the same ordered group towards the designated destination agent for processing (833).

If the request complete message has not been received by the receiving agent 902, the receiving agent 902 determines whether the subsequent or next request, in the same ordered group as the earlier request, is an un-ordered request (i.e., req<unorder>) (815). If the next request is an unordered request, then the receiving agent 902 waits for one or more request complete messages from the destination agent for previously issued and/or previously received forward-ordered (i.e., req<fworder>) and/or sequential-ordered (i.e., req<sorder>) requests issued on a different path at the ordering fork (835). After the awaited request complete message(s) have been received, the receiving agent 902 forwards the next request to the destination agent for processing (833). After the request has been forwarded to the destination agent, the receiving agent examines the next request in the ordered group (807).

If the next request is not an un-ordered request, then the receiving agent 902 determines whether the next request, in the same ordered group as the earlier request, is a forward-ordered request (817). If the next request is a forward-ordered request, then the receiving agent 902 waits for one or more request complete messages from the destination agent for previously received forward-ordered and/or sequential-ordered requests issued on a different path at the ordering fork (835). After the awaited request complete message(s) have been received, the receiving agent forwards the next request to the destination agent for processing (833). After the request has been forwarded to the destination agent, the receiving agent examines the next request in the ordered group (807).

If the next request is not an un-ordered and forward-ordered request, then the receiving agent 902 determines whether the next request is an backward-ordered request (819). If the next request is a backward-ordered request, then the receiving agent 902 waits for one or more request complete messages from the destination agent for previously received un-ordered, forward-ordered, backward-ordered and/or sequential-ordered requests issued on a different path at the ordering fork (837). After the awaited request complete message(s) have been received, the receiving agent forwards the next request to the destination agent for processing (833). After the request has been forwarded to the destination agent, the receiving agent examines the next request in the ordered group (807).

If the next request is not an un-ordered, forward-ordered request or a backward-ordered request, then the receiving agent 902 determines whether the next request, in the same ordered group as the earlier request, is a sequentially-ordered request (821). If the next request is a sequentially-ordered request, then the receiving agent 902 waits for one or more request complete messages from the destination node for previously received un-ordered, forward-ordered, backward-ordered and/or sequential-ordered requests issued on a different path at the ordering fork (837). After the awaited request complete message(s) have been received, the receiving agent forwards the next request to the destination agent for processing (833). After the request has been forwarded to the destination agent, the receiving agent examines the next request in the ordered group (807).

Ordering semantics may apply to transactions that belong to the same ordered group. In embodiments of the present invention, requests may belong to the same ordering group if, for example, the requests have the same streaming ID (i.e., StrmID), same issuing NodeID and/or belong to the same peripheral domain (e.g., system specific collection of addresses such as the addresses located at an I/O bus). It is recognized that additional criteria may be used to established that requests belong to the same ordering group. Since, coherent and non-coherent transactions represent transactions of different type, no ordering relationship may be defined between these types of transactions.

The present invention may be used to for efficient pipe-lining of ordered requests in a multi-node architecture. Several embodiments of the present invention are specifically illustrated and/or described herein. However, it will be appreciated that modifications and variations of the present invention are covered by the above teachings and within the purview of the appended claims without departing from the spirit and intended scope of the invention. For example, while the nodes in FIG. 1 are shown containing one or two processors, a node may contain any number of processors. In one embodiment, a node contains only one processor, and in another embodiment a node contains sixteen processors.

As another example, while the nodes in FIG. 1 are connected through receiving agent 140, in another embodiment two or more nodes may be directly connected to each other and the switching agent could be implemented in a distributed manner integrated in the node controllers of the node(s). For example, in a system with that has two nodes, the node controller of a first node may be connected to the node controller of a second node. In another embodiment, the node controller for a node may be part of a processor in that node. For example, a first node in a system may only contain one processor, and the node controller for that node may be part of that processor. In addition, a node (e.g., node 110) may contain one or more processors and an input/output hub.

What is claimed is:

1. A method of managing transaction requests in a multi-node architecture, the method comprising:
    forwarding a previously received ordered group request to a destination agent;
    determining whether a next received ordered group request belongs to a same ordered group as the previously received ordered group request;
    determining whether an ordering fork is encountered if the next received ordered group request belongs to the same ordered group as the previously received ordered group request;
    if an ordering fork is encountered, determining whether a request complete message for the previously received ordered group request has been received; and
    if the request complete message for the previously received ordered group request has not been received and the next received ordered group request in the same ordered group is at least one of a un-ordered request and a forward-ordered request, then forwarding the next received ordered group request to the destination agent after the request complete message for the previously received at least one of a forward-ordered request and a sequential-ordered request issued on a different path at the ordering fork has been received.

2. The method of claim 1, further comprising:
    forwarding the next received ordered group request to the destination agent if the next received ordered group request belongs to a different ordered group than the ordered group of the previously received ordered group request.

3. The method of claim 1, further comprising:
    forwarding the next received ordered group request to the destination agent if no ordering fork is encountered.

4. The method of claim 1, further comprising:
    forwarding the next received ordered group request in the same ordered group to the destination agent if the request complete message for the previously received ordered group request has been received.

5. The method of claim 1, further comprising:
    if the request complete message for the previously received ordered group request has not been received and the next received ordered group request in the same ordered group is at least one of a backward-ordered request and a sequentially-ordered request, then forwarding the next received ordered group request to the destination agent after the request complete message for the previously received at least one of a un-ordered, forward-ordered, backward-ordered and sequential-ordered requests issued on the different path at the ordering fork has been received.

6. A system of managing transaction requests in a multi-node architecture, the system comprising:
    a requesting agent to issue one or more ordered group requests;
    a receiving agent to receive the one or more issued ordered group requests and to examine the one or more issued ordered group requests; and
    a destination agent to process the one or more issued ordered group requests, wherein the receiving agent to examine the one or more issued ordered group requests to determine whether a request complete message for a previously received ordered group request has been received, and if the request complete message for the previously received ordered group request has not been received and a next received ordered group request is at least one of a un-ordered request and a forward-ordered request, then the receiving agent to forward the next received ordered group request to the destination agent after the request complete message for the previously received at least one of a forward-ordered request and a sequential-ordered request issued on a different path at an ordering fork has been received.

7. The system of claim 6, wherein receiving agent further determines whether the next received ordered group request belongs to a same ordered group as the previously received ordered group request.

8. The system of claim 7, wherein the receiving agent forwards the next received ordered group request to the destination agent if the next received ordered group request belongs to a different ordered group than the ordered group of the previously received ordered group request.

9. The system of claim 7, wherein the receiving agent forwards the next received ordered group request in the same ordered group as the previously received ordered group request to the destination agent if the request complete message for the previously received ordered group request has been received.

10. The system of claim 6, wherein the receiving agent forwards the next received ordered group request to the destination agent if no ordering fork is encountered.

11. The system of claim 6, wherein if the request complete message for the previously received ordered group request has not been received and the next received ordered group request is at least one of a backward-ordered request and a sequentially-ordered request, then the receiving agent forwards the next received ordered group request to the destination agent after the request complete message for the previously received at least one of a un-ordered, forward-ordered, backward-ordered and sequential-ordered requests issued on the different path at the ordering fork has been received.

12. A receiving agent for managing transaction requests in a multi-node architecture, wherein the receiving agent comprising:
    a processor to forward a previously received ordered group request to a destination agent, the processor further to receive one or more ordered group requests from a requesting agent and to examine the one or more issued ordered group requests to determine whether a request complete message for a previously received ordered group request has been received, the processor additionally to determine whether an ordering fork is encountered if the next received ordered group request belongs to the same ordered group as the previously received ordered group request, and if the request complete message for the previously received ordered group request has not been received and a next received ordered group request is at least one of a un-ordered request and a forward-ordered request, then the processor to forward the next received ordered group request to the destination agent after the request complete message for the previously received at least one of a forward-ordered request and a sequential-ordered request issued on a different path at the ordering fork has been received.

13. The receiving agent of claim 12, wherein the processor further determines whether the next received ordered group request belongs to a same ordered group as the previously received ordered group request.

14. The receiving agent of claim 13, wherein the processor forwards the next received ordered group request to the destination agent if the next received ordered group request belongs to a different ordered group than the ordered group of the previously received ordered group request.

15. The receiving agent of claim 13, wherein the processor forwards the next received ordered group request in the same ordered group as the previously received ordered group request to the destination agent if the request complete message for the previously received ordered group request has been received.

16. The receiving agent of claim 12, wherein the processor forwards the next received ordered group request to the destination agent if no ordering fork is encountered.

17. The receiving agent of claim 12, wherein if the request complete message for the previously received ordered group request has not been received and the next received ordered group request is at least one of a backward-ordered request and a sequentially-ordered request, then the processor forwards the next received ordered group request to the destination agent after the request complete message for the previously received at least one of a un-ordered, forward-ordered, backward-ordered and sequential-ordered requests issued on the different path at the ordering fork has been received.

18. A method for managing transaction requests in a multi-node architecture, the method comprising:
forwarding a previously received ordered group request to a destination agent;
receiving one or more ordered group requests from a requesting agent;
examine the one or more issued ordered group requests to determine whether a next received ordered group request belongs to a same ordered group as the previously received ordered group request;
determine whether an ordering fork is encountered if the next received ordered group request belongs to the same ordered group as the previously received ordered group request;
if the request complete message for the previously received ordered group request has not been received and a next received ordered group request is at least one of a un-ordered request and a forward-ordered request, then forwarding the next received ordered group request to the destination agent after the request complete message for the previously received at least one of a forward-ordered request and a sequential-ordered request issued on a different path at the ordering fork has been received.

19. The method of claim 18, further comprising:
forwarding a previously received ordered group request to the destination agent.

20. The method of claim 18, further comprising:
determining whether the next received ordered group request belongs to a same ordered group as the previously received ordered group request.

21. The method of claim 20, further comprising:
forwarding the next received ordered group request to the destination agent if the next received ordered group request belongs to a different ordered group than the ordered group of the previously received ordered group request.

22. The method of claim 20, further comprising:
forwarding the next received ordered group request in the same ordered group as the previously received ordered group request to the destination agent if the request complete message for the previously received ordered group request has been received.

23. The method of claim 18, further comprising:
forwarding the next received ordered group request to the destination agent if no ordering fork is encountered.

24. The method of claim 18, further comprising,
if the request complete message for the previously received ordered group request has not been received and the next received ordered group request is at least one of a backward-ordered request and a sequentially-ordered request, then forwarding the next received ordered group request to the destination agent after the request complete message for the previously received at least one of a un-ordered, forward-ordered, backward-ordered and sequential-ordered requests issued on the different path at the ordering fork has been received.

25. A machine-readable medium having stored thereon a plurality of executable instructions, the plurality of instructions comprising instructions to:
forward a previously received ordered group request to a destination agent;
determine whether a next received ordered group request belongs to a same ordered group as the previously received ordered group request;
determine whether an ordering fork is encountered if the next received ordered group request belongs to the same ordered group as the previously received ordered group request;
if an ordering fork is encountered, determine whether a request complete message for the previously received ordered group request has been received; and
if the request complete message for the previously received ordered group request has not been received and the next received ordered group request in the same ordered group is at least one of a un-ordered request and a forward-ordered request, then forward the next received ordered group request to the destination agent after the request complete message for the previously received at least one of a forward-ordered request and a sequential-ordered request issued on a different path at the ordering fork has been received.

26. The machine-readable medium of claim 25 having stored thereon additional executable instructions, the additional instructions comprising instructions to:
forward the next received ordered group request to the destination agent if the next received ordered group request belongs to a different ordered group than the ordered group of the previously received ordered group request.

27. The machine-readable medium of claim 25 having stored thereon additional executable instructions, the additional instructions comprising instructions to:

forward the next received ordered group request to the destination agent if no ordering fork is encountered.

28. The machine-readable medium of claim 25 having stored thereon additional executable instructions, the additional instructions comprising instructions to:

forward the next received ordered group request in the same ordered group to the destination agent if the request complete message for the previously received ordered group request has been received.

29. The method of claim 25, further comprising:

if the request complete message for the previously received ordered group request has not been received and the next received ordered group request in the same ordered group is at least one of a backward-ordered request and a sequentially-ordered request, then forward the next received ordered group request to the destination agent after the request complete message for the previously received at least one of a un-ordered, forward-ordered, backward-ordered and sequential-ordered requests issued on the different path at the ordering fork has been received.

* * * * *